United States Patent
Xie

(10) Patent No.: US 8,056,823 B2
(45) Date of Patent: Nov. 15, 2011

(54) CONSTANT TEMPERATURE AND BALANCED PRESSURE VALVE CORE WITH SINGLE HANDLE

(75) Inventor: Qingjun Xie, Zhuhai (CN)

(73) Assignee: Suprema (Zhuhai J/V/) Thermostatic Sanitaryware Co., Ltd., Hongwan Industrial Zone Xiangzhou, Zhuhai (CN)

( * ) Notice: Subject to any disclaimer, the term of this patent is extended or adjusted under 35 U.S.C. 154(b) by 487 days.

(21) Appl. No.: 12/379,263

(22) Filed: Feb. 18, 2009

(65) Prior Publication Data

US 2010/0163118 A1 Jul. 1, 2010

(30) Foreign Application Priority Data

Dec. 25, 2008 (CN) .......................... 2008 1 0220339
Dec. 25, 2008 (CN) .......................... 2008 1 0220340

(51) Int. Cl.
G05D 23/13 (2006.01)
(52) U.S. Cl. ................................. 236/12.11; 236/12.17
(58) Field of Classification Search ............... 236/12.11, 236/12.17, 12.18, 12.2; 137/468
See application file for complete search history.

(56) References Cited

U.S. PATENT DOCUMENTS 5,433,378 A * 7/1995 Orlandi .......................... 236/12.2
7,770,808 B2 * 8/2010 Ruga et al. .................... 236/12.2

FOREIGN PATENT DOCUMENTS

CN 2665478 Y 12/2004
CN 2874157 Y 2/2007

* cited by examiner

Primary Examiner — Marc Norman
(74) Attorney, Agent, or Firm — Lau & Associates, LLC.

(57) ABSTRACT

A constant temperature and balanced pressure valve core with single handle comprises a valve cover, and a temperature adjusting assembly, a thermo-sensitive element, a put-off spring, an adjuster, combined in the chamber of the valve cover from top to bottom; and the valve cover is provided with a cold water inlet, a hot water inlet and an water outlet; wherein the valve core also comprises a water division mechanism and an compacting sealing part; the water division mechanism matches with the cold water inlet and the hot water inlet, forming the cold water passage and hot water passage, and provides a cold water control port and a hot water control port that respectively match with the cold water passage and the hot water passage; the compacting sealing part forms seal with the inner wall of the valve cover, and holds the water division mechanism in the valve cover; the adjuster matches with the thermo-sensitive element and the put-off spring, and on the action of the thermo-sensitive element and the put-off spring, the adjuster can float between the cold water control port and the hot water control port.

18 Claims, 9 Drawing Sheets

CONSTANT TEMPERATURE AND BALANCED PRESSURE VALVE CORE WITH SINGLE HANDLE

FIELD OF THE INVENTION

The invention relates to a technical field of plumbing, in particular to a constant temperature and balanced pressure valve core.

BACKGROUND OF THE INVENTION

With the advancement of science and technology and the improvement of living standard, the constant temperature valve cores have been widely used in each kind of water supply system for bath in household and hotel, etc. The users can adjust the outlet water temperature according to actual demands by the valve cores, and after presetting temperature, the mixed outlet water temperature will be constant, thus, the problem of sometimes hot and sometimes cold water due to change of inlet water pressure and temperature by common valve core can be solved, and the valve core is safe and prevent user's scald.

The key points of effectively keeping the outlet water temperature constant are to sense and measure true and effective the outlet water temperature, and to sensitively adjust the proportion of cold and hot inlet water. Sensing and measuring true and effective outlet water temperature means to fully mix cold and hot water, sense and measure the temperature of the outlet mixed water, which can be completely achieved with prior art;

In addition, the controlling the inlet water pressure balance is also a critical factor that ensures the outlet water temperature constant. The majority of the prior constant temperature valve cores are not provided with the function of balanced pressure, which is to say cold and hot water directly enter into a mixed water chamber to mix from the bottom or the side end of the valve core; while the few constant-temperature valve cores that are provided with the function of balanced pressure apply independent balanced pressure assembly to control, whose principle is to balance the inlet water pressure through the floating of the balanced pressure assembly, such as the patent of utility model with authorized publication patent number of CN2874157Y. However, applying independent balanced pressure elements has the disadvantages of complex structure and inconvenient assembly.

Besides, the current constant-temperature valve cores have wider scope of temperature adjusting and higher upper temperature limit, without the control of secure temperature, such accidents as scald, etc. are easier to be caused as the outlet water temperature is too high when operating improperly.

SUMMARY OF THE INVENTION

The invention provides a constant temperature and balanced pressure valve core with single handle, forms a flexuous inlet water passage in valve core based on constant temperature function and simple structure, to realize the function of balanced pressure by the flexuous inlet water passage.

The objective is achieved by applying following technical solution:

A constant temperature and balanced pressure valve core with single handle comprises a valve cover, and a temperature adjusting assembly, a thermo-sensitive element, a put-off spring, an adjuster, combined in the chamber of the valve cover from top to bottom; and the valve cover is provided with a cold water inlet, a hot water inlet and an water outlet; wherein the valve core also comprises a water division mechanism and an compacting sealing part; the water division mechanism matches with the cold water inlet and the hot water inlet, forming the cold water passage and hot water passage, and provides a cold water control port and a hot water control port that respectively match with the cold water passage and the hot water passage; the compacting sealing part forms seal with the inner wall of the valve cover, and holds the water division mechanism in the valve cover; the adjuster matches with the thermo-sensitive element and the put-off spring, and on the action of the thermo-sensitive element and the put-off spring, the adjuster can float between the cold water control port and the hot water control port.

In particular, the water division mechanism comprises a water separation part and a water division part, the bottom of the water separation part is equipped with a sealing mechanism separating cold water inlet from hot water inlet, the cold water passage is formed between the outer wall of the water separation part and the inner wall of the valve cover; the hot water passage is formed in the interior of the water separation part; the top of the water division part is equipped with the cold water control port, and the foot of the water division part is equipped with the hot water control port; the water division part is hermetically matched with the water separation part by the seal ring between the cold water control port and the hot water control port.

Especially, the water division mechanism is a single water division part, the side wall of the water division part is equipped with a sealing mechanism, which matches with the inner wall of the valve cover, the cold water passage is formed between the part of the water division part above the sealing mechanism and the inner wall of the valve cover, the hot water passage is formed between the part of the water division part below the sealing mechanism and the inner wall of the valve cover; the upper part of the water division is equipped with the cold water control port, and the lower part is equipped with the hot water control port.

The temperature adjusting assembly comprises a valve handle, a link gear of the valve handle and a temperature limiting and adjusting screw, the upper part of the valve handle protrudes from the top of the temperature adjusting valve cover, the link gear of the valve handle matches with the lower part of the temperature adjusting valve handle, and makes reciprocating action up and down driven by the temperature adjusting valve handle, a inner bolt hole is arranged in the valve handle, and the temperature limiting and adjusting screw whose height can be adjusted is matched with the inner bolt, which can prop with the link gear of the valve handle downward.

In the invention, the temperature adjustment, the temperature sensing and the proportion of cold and hot inlet water maintain similar structure and function with the prior constant-temperature valve cores, which ensure the constant temperature. By arranging the water division mechanism, the flexuous inlet water passage is formed when separating cold and hot inlet water. In theory, the flexuous inlet water passage has a certain resistance or inhibition for inlet water. The test result shows that the flexuous inlet water passage has obvious effect on balancing inlet water pressure. The temperature limiting and adjusting screw arranged in the inner bolt hole of the valve core can prop the link gear of the valve core downward. By adjusting the height of the temperature limiting and adjusting screw, the upper limit value of the temperature can be preset. The invention also has the advantages of simple structure, safe and reliable.

DESCRIPTION OF EMBODIMENTS

Embodiment I

Figure 1:
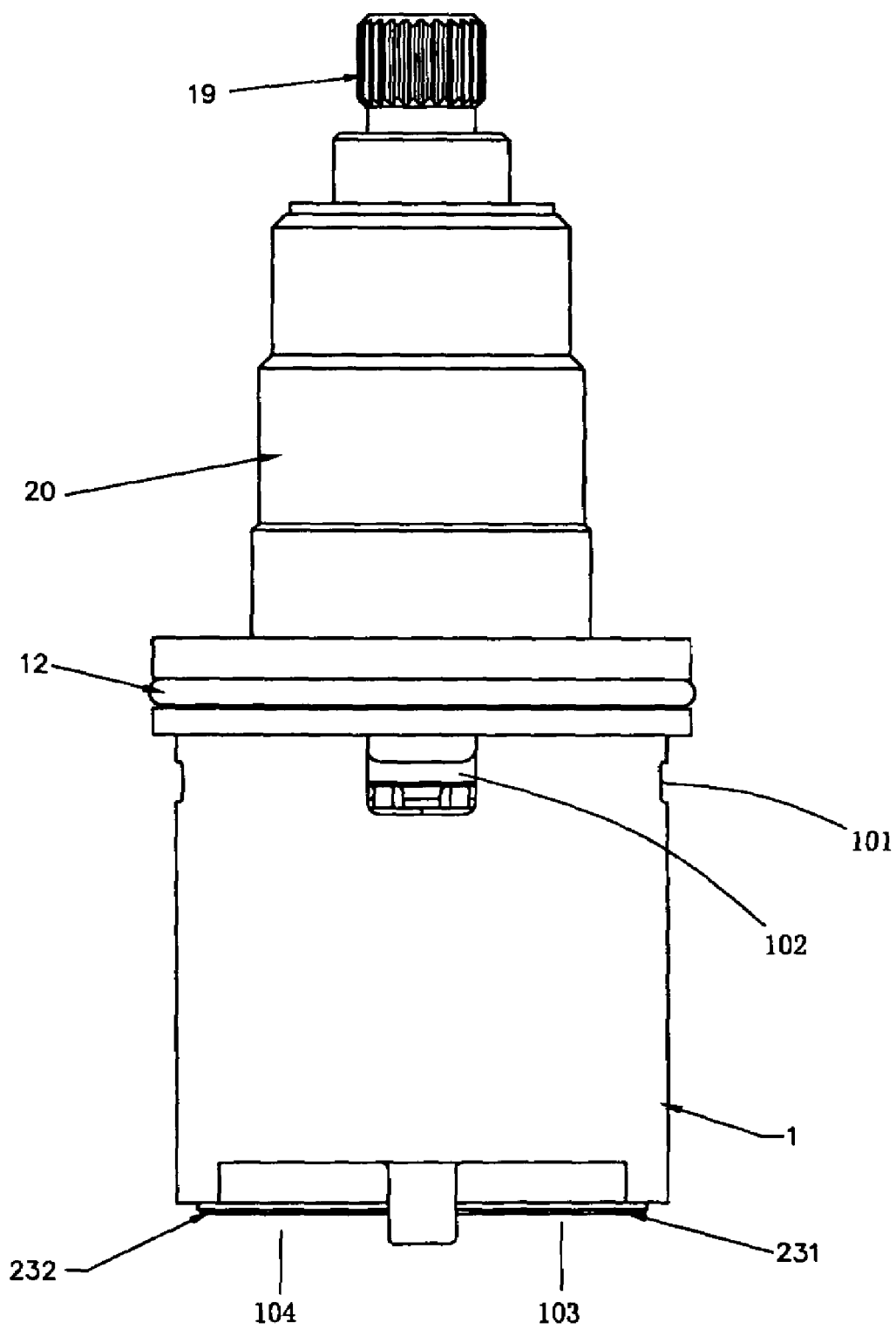
FIG. 1 is an front view of the embodiment I of the invention.
Figure 2:
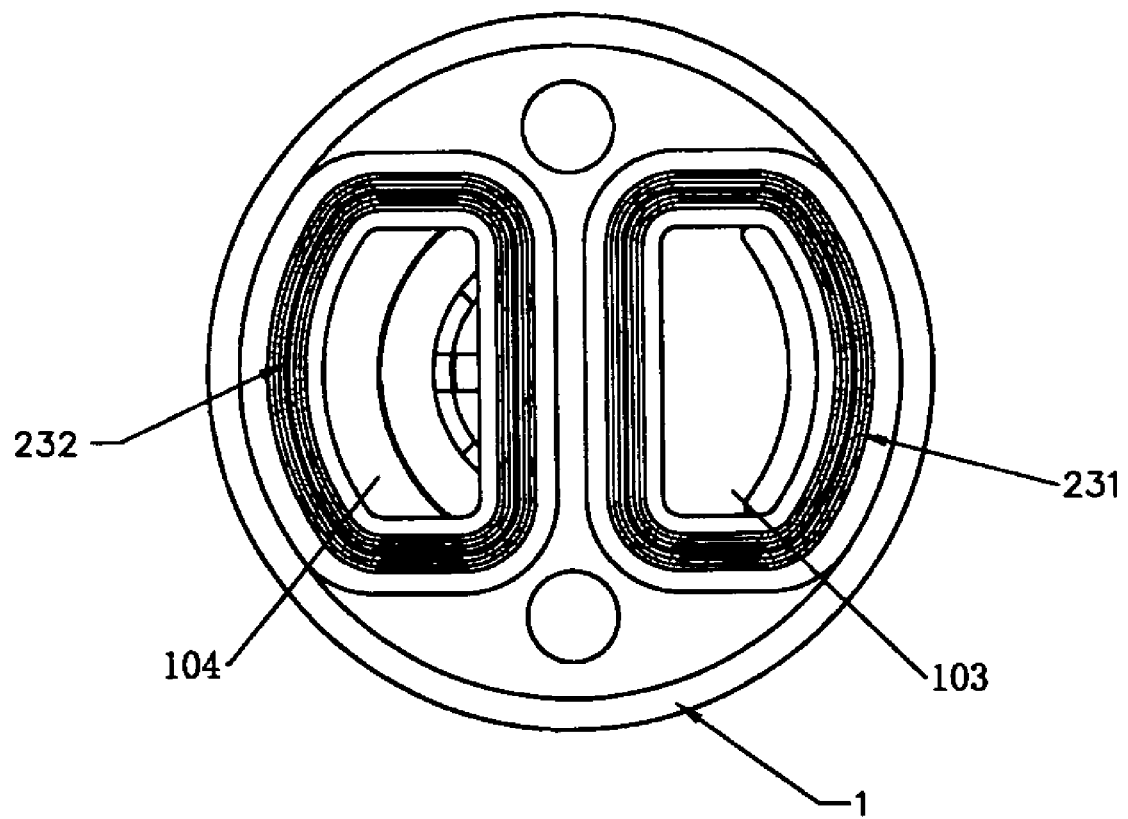
FIG. 2 is an bottom view of the embodiment I of the invention.

Combining the FIGS. 1, 2, 3 and 4, the constant temperature and balanced pressure valve core with single handle provided by the embodiment comprises a lower valve cover 1, a first seal ring 2, a water separation part 3, a water division part 4, a put-off spring 5, a second seal ring 6, a third seal ring 7, an adjuster 8, a fourth seal ring 9, a compacting sealing part 10, a fifth seal ring 11, a sixth seal ring 12, a thermo sensitive element 13, a seventh seal ring 14, a fixing screw 15, a tip cap 16, a buffer spring 17, a screw-stem 18, a valve handle 19, a temperature adjusting valve cover 20, a limit ring 21, a temperature limiting and adjusting screw 22, a seal ring 231 of the cold water inlet and a seal ring 232 of the hot water inlet.

Figure 3:
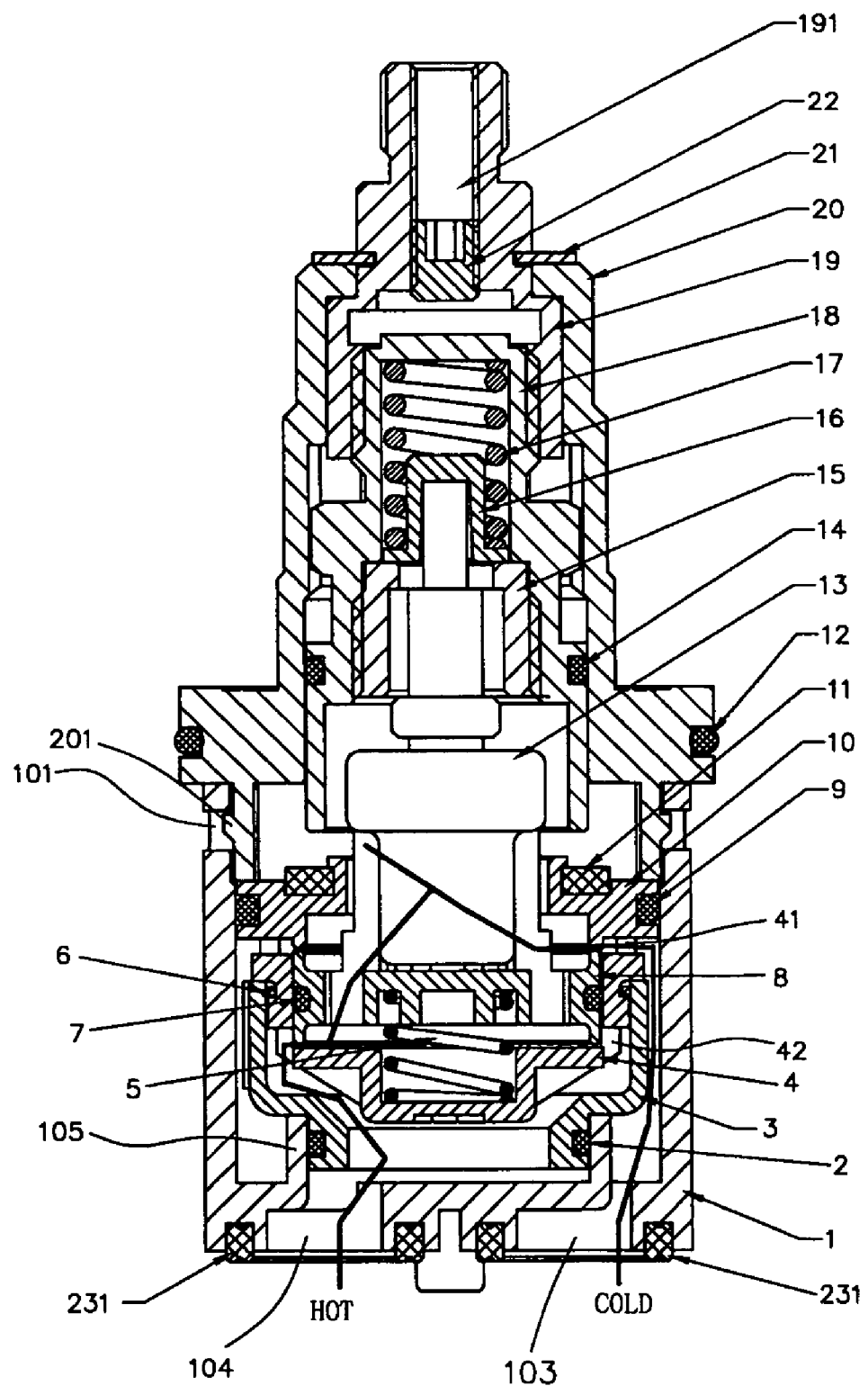
FIG. 3 is a section view of the embodiment I of the invention.
Figure 4:
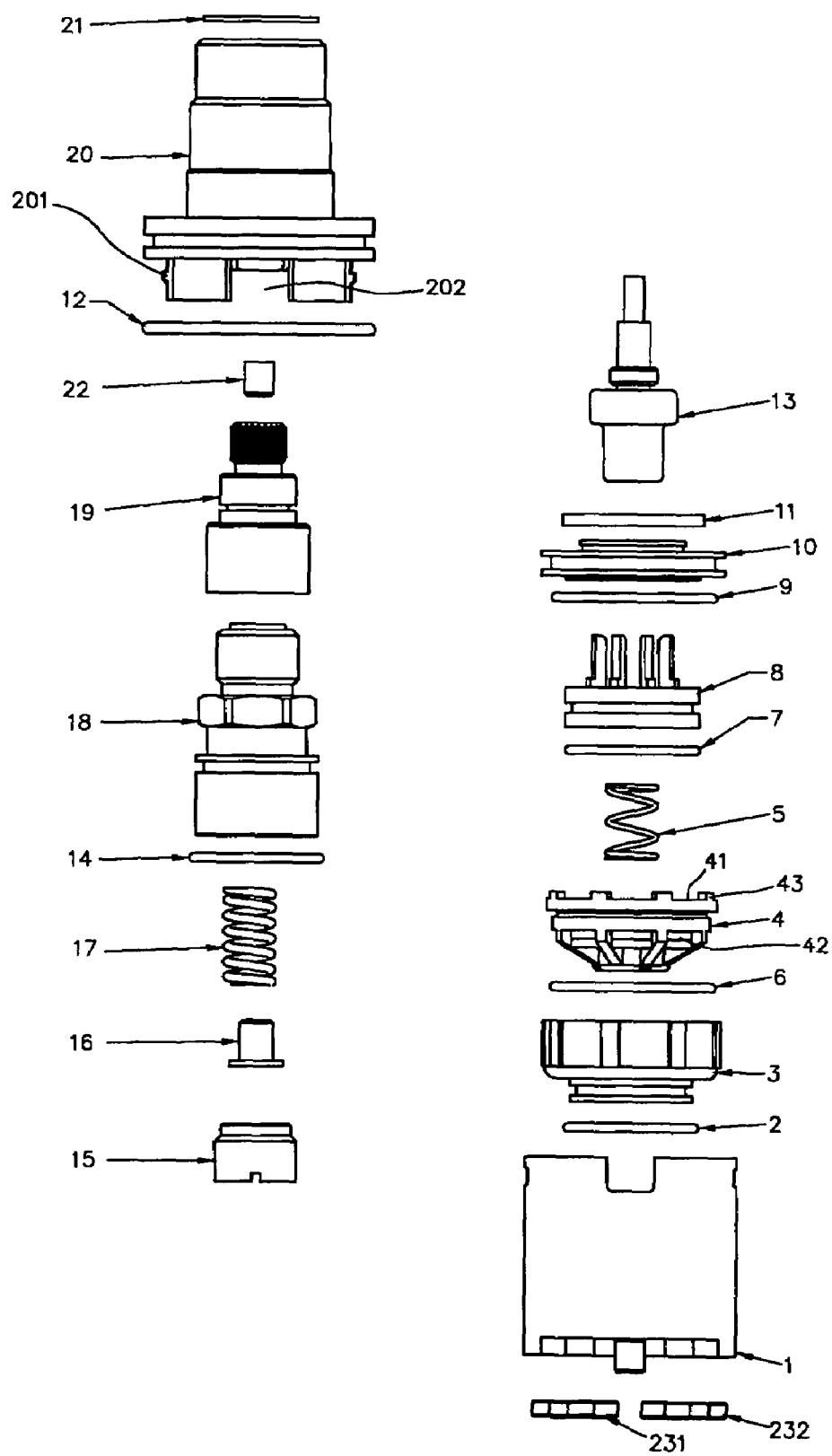
FIG. 4 is an explosion diagram of the embodiment I of the invention.

Referring to the FIGS. 3 and 4, the sixth seal ring 12 is arranged on the periphery of the temperature adjusting valve cover 20; a buckle 201 and a mating water outlet 202 are arranged on the lower part of the temperature adjusting valve cover 20. A notch 101 and a water outlet 102 are correspondingly arranged on the upper part of the lower valve cover 1; a cold water inlet 103 and a hot water inlet 104 are arranged at the bottom of the lower valve cover 1, and the seal ring 231 of the cold water inlet and the seal ring 232 of the hot water inlet are respectively arranged in the cold water inlet 103 and the hot water inlet 104. The temperature adjusting valve cover 20 is matched with the lower valve cover 1, then a whole valve cover is formed (combining the FIG. 1), and an chamber is formed in the interior of the whole valve cover.

Referring to the FIGS. 3 and 4, an inner hole is processed in the screw-stem 18. The buffer spring 17, the tip cap 16 and the fixing screw 15 are arranged in the inner hole of the screw-stem 18 from top to bottom, which forms a whole link gear of the valve handle. The tip cap 16 is compacted by fixing screw 15 matching with the buffer spring 17, and the tip cap 16 props and matches with the thimble of the thermo sensitive element 13. The screw-stem 18 matches with the valve handle 19 through trapezoid thread; consequently, the whole link gear can be driven to make reciprocating action up and down when turning the valve handle 19 leftward and rightward. In order to avoid rotation of the screw-stem 18 with the valve handle 19, a hexagon is designed in the periphery of the screw-stem 18 in the embodiment, so the screw-stem can only slide up and down in the valve cover. The upper part of the valve handle is extruded from the top of the temperature adjusting valve cover 20; the whole temperature adjusting assembly which is used for cooperating with thermo sensitive element 13 to adjust the heat sensitivity of the thermo sensitive element 13 composes of the valve handle 19 and the link gear, and accordingly, the outlet water temperature can be preset. The a limit ring 21 is arranged in the limit ring groove which is cut on the valve handle 19, and clings on the top of the temperature adjusting valve cover 20; the seventh seal ring 14 is arranged between the inner wall of the temperature adjusting valve cover 20 and the outer wall of the screw-stem 18. There is an inner bolt hole 191 in the valve handle 19; the temperature limiting and adjusting screw 22 whose height can be adjusted is arranged in the inner bolt hole 191 and can downward prop with the screw-stem 18.

Figure 5:
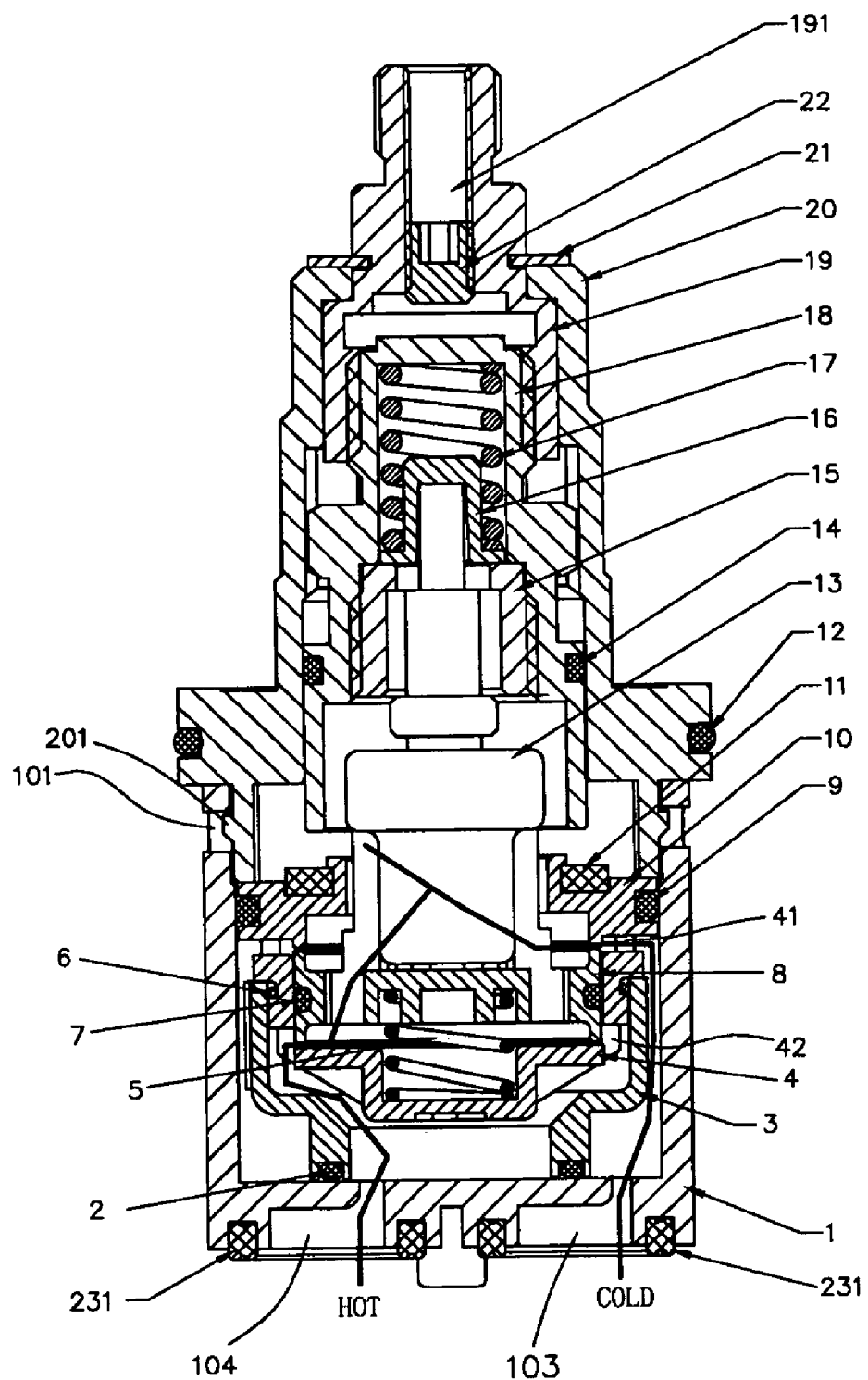
FIG. 5 is a section view of another match mode between the water division mechanism and the lower valve cover.
Figure 6:
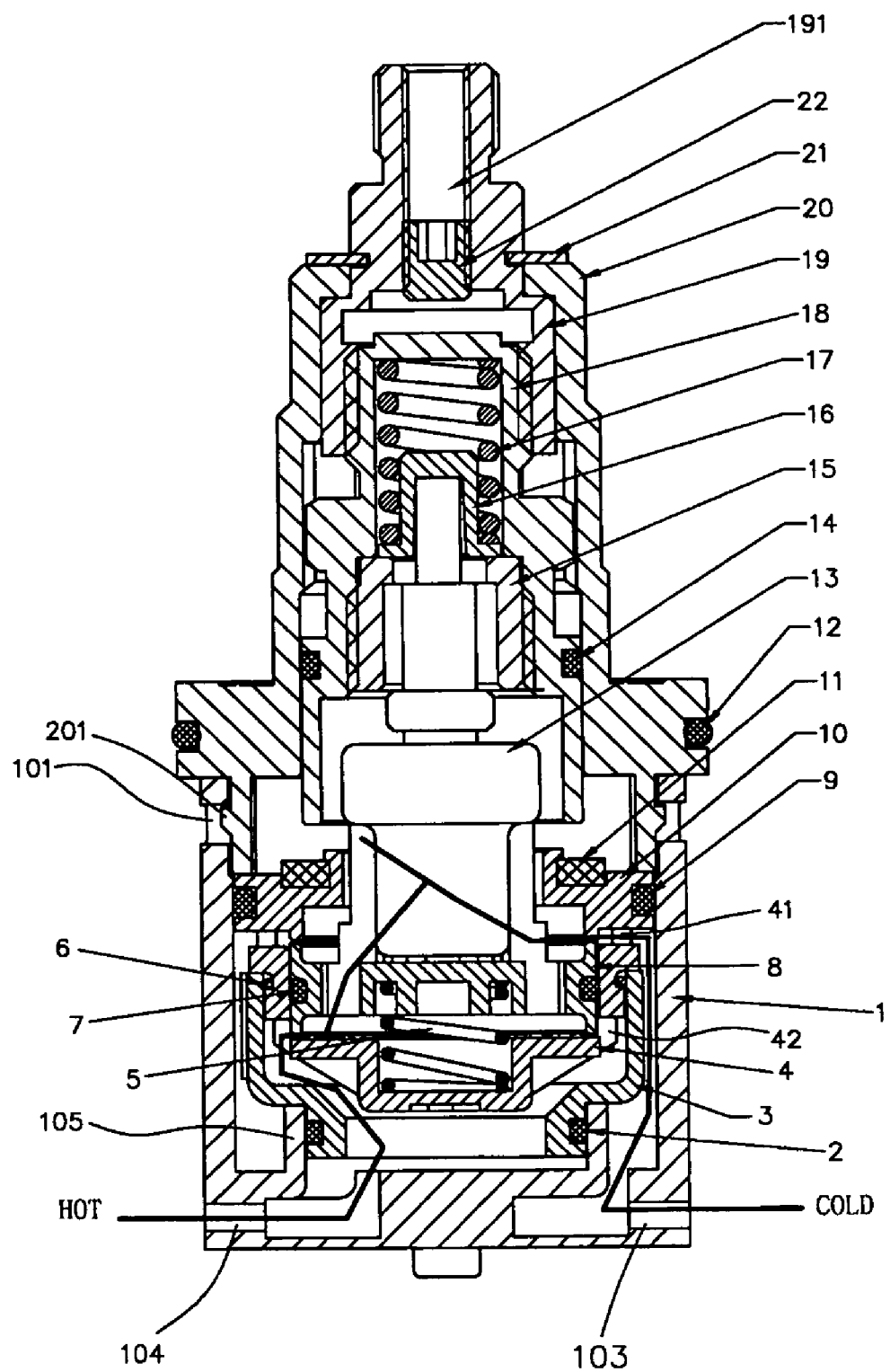
FIG. 6 is a schematic view of cold water inlet and hot water inlet that arranged on the side wall at the bottom of the valve cover.

Referring to the FIGS. 3 and 4, a water separating ring 105 for separating the cold water inlet 103 and the hot water inlet 104 is integrally formed at the bottom of the lower valve cover 1; the water separation part 3 is arranged at the inner lower part of the lower valve cover 1, hermetically matching by the first seal ring 2 that arranged at the bottom of the water separation part with the water separating ring 105, the cold water passage will be formed between the outer wall of the water separation part 3 and the inner wall of the lower valve cover 1, and the hot water passage will be formed in the interior of the water separation part 3; certainly, the water separating ring 105 may also not arranged, the sealing mechanism at the bottom of the water separation part 3 can directly separate the cold water inlet 103 and the hot water inlet 104, and from the cold water passage and the hot water passage (as shown in the FIG. 5); certainly, the cold water inlet 103 and the hot water inlet 104 can also be arranged on the side wall on the lower part of the lower valve cover 1 (as shown in the FIG. 6). The lower part of the water division part 4 is arranged in the water separation part 3, and the upper part is supported on the top of the water separation part 3; a cold water control port 41 that communicates with the cold water passage is provided on the top of the water division part 4, a hot water control port 42 that communicates with the hot water passage is provided on the lower part of the water division part 4; the second seal ring 6 is arranged on the periphery of the water separation part 4 between the cold water control port 41 and the hot water control port 42, and the water division part is hermetically matched with the inner wall of the water separation part 3 by the second seal ring 6. The water separation part 3 and the water division part 4 form a water division mechanism. A pressure bearing part 43 is arranged at the place of the cold water control port 41; the compacting sealing part 10 is a ring shape, whose center hole is water outlet and used as puncture of the thermo sensitive element 13. The fourth seal ring 9 is arranged in the periphery of the compacting sealing part 10; by the fourth seal ring 9, the compacting sealing part 10 forms sealing with the inner wall of the lower valve cover 1; the compacting sealing part 10 downward matches with the pressure bearing part 43 and compacts the water division mechanism in the lower valve cover 1. The fifth seal ring 11 is arranged on the upper surface of the compacting sealing part 10 by circling the position of central hole.

The temperature sensing probe of the thermo sensitive element 13 extends in the lower valve cover 1, and cooperated with the adjuster 8; the adjuster 8 is arranged in the water division part 4; the third seal ring 7 is arranged between the inner wall of the water division part 4 and the adjuster 8; the put-off spring 5 is arranged below the adjuster 8 and props between the bottom of the adjuster 8 and the bottom of the water division part 4; the adjuster 8 can make reciprocating action up and down between the cold water control port 41 and the hot water control port 42 by the action of the thermo sensitive element 13 and the put-off spring 5.

The working procedure of the constant temperature and balanced pressure valve core with single handle provided by the embodiment is as follows: cold and hot water are respectively input from the cold water inlet 103 and the hot water inlet 104, and then reach the cold water control port 41 and the hot water control port 42 after respectively passing through the cold water passage and the hot water passage formed by the water division mechanism, then flow into the fixed water chamber according to current proportion controlled by the adjuster 8; after fully mixing, flow upward to the temperature sensing probe of the thermo sensitive element 13; and finally flow out from the water outlet 102 after passing the central hole of the compacting sealing part 10. Meanwhile, the outlet water temperature is real-time controlled by the thermo sensitive element 13. When the supply water temperature or pressure changes, the thermo sensitive element 13 will cooperate with the put-offspring 5 to drive the adjuster 8 to move up and down, so as to change the inlet proportion of cold and hot water, and keep the outlet water constant temperature.

The principle of water temperature adjusting of the constant temperature and pressure valve core with single handle provided by the embodiment is as follows: turn the temperature adjusting valve handle 19 leftward and rightward; the rotation of the valve handle 19 can be converted into the reciprocating action up and down of the link gear of the valve handle through the function of the trapezoid thread; consequently, the link gear of the valve handle can drive the thimble of the thermo sensitive element 13; accordingly, the heat sensitivity of the thermo sensitive element 13 can be regulated, and the temperature can be preset.

The principle of balanced pressure of the constant temperature and balanced pressure valve core with single handle provided by the embodiment is as follows: by arranging water division mechanism and making use of its cold and hot water inlet control ports, flexuous cold and hot inlet water passages is formed. In theory, the flexuous inlet water passage has a certain resistance or inhibition for inlet water; the test result shows that the flexuous inlet water passage has obvious function on balancing inlet water pressure.

The principle of controlling maximum safe water temperature of the constant temperature and balanced pressure valve core with single handle provided by the embodiment is as follows: by arranging the temperature limiting and adjusting screw 22 in the inner bolt hole 191 of the valve handle 19, the temperature limiting and adjusting screw 22 can downward prop the link gear of the valve handle; by adjusting the height of the temperature limiting and adjusting screw 22, the relative position of the link gear of the valve handle and the valve handle 19 can be limited; consequently, the upper limit value of adjusting temperature can be preset when using.

Embodiment II

Figure 7:
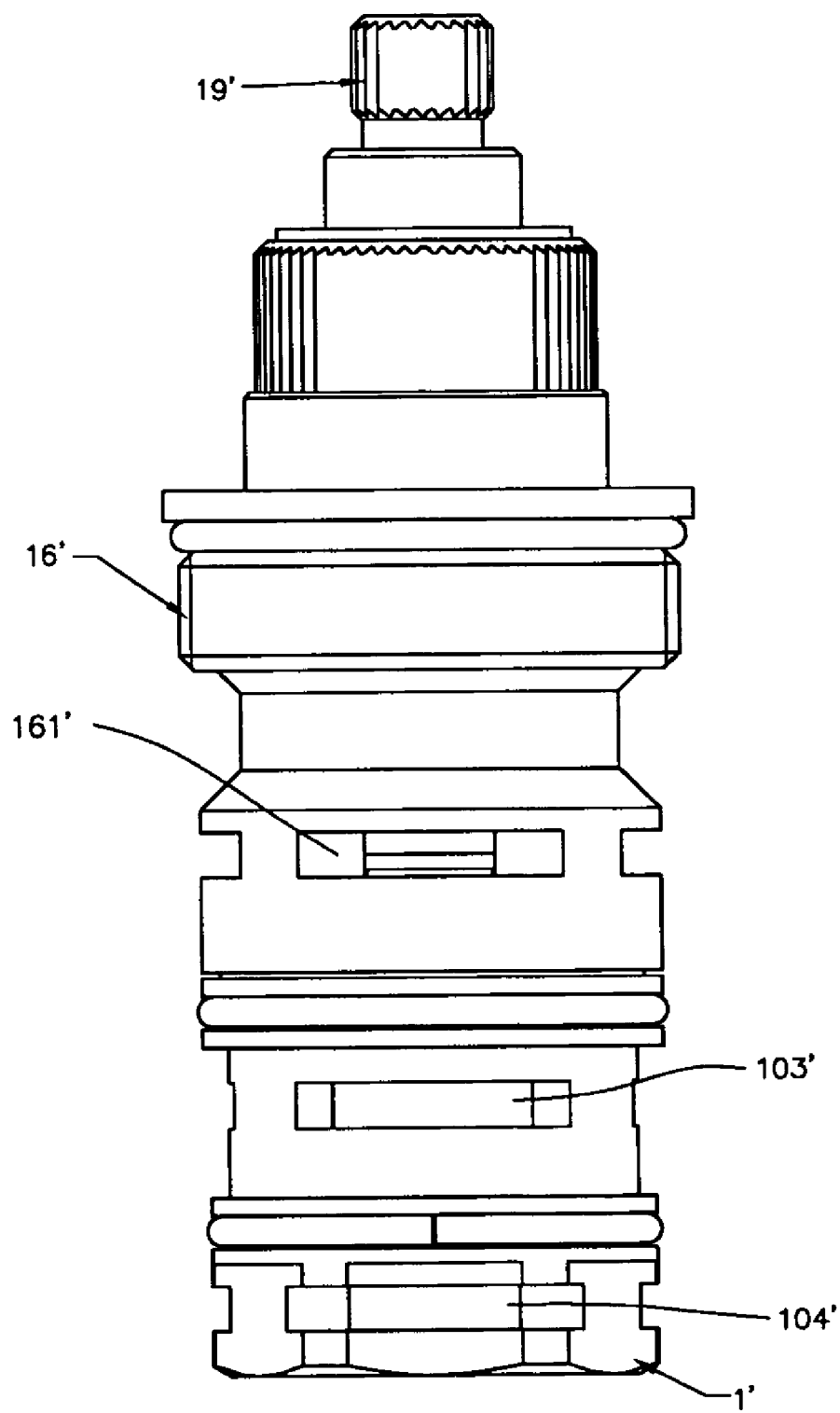
FIG. 7 is an front view of the embodiment II of the invention.
Figure 8:
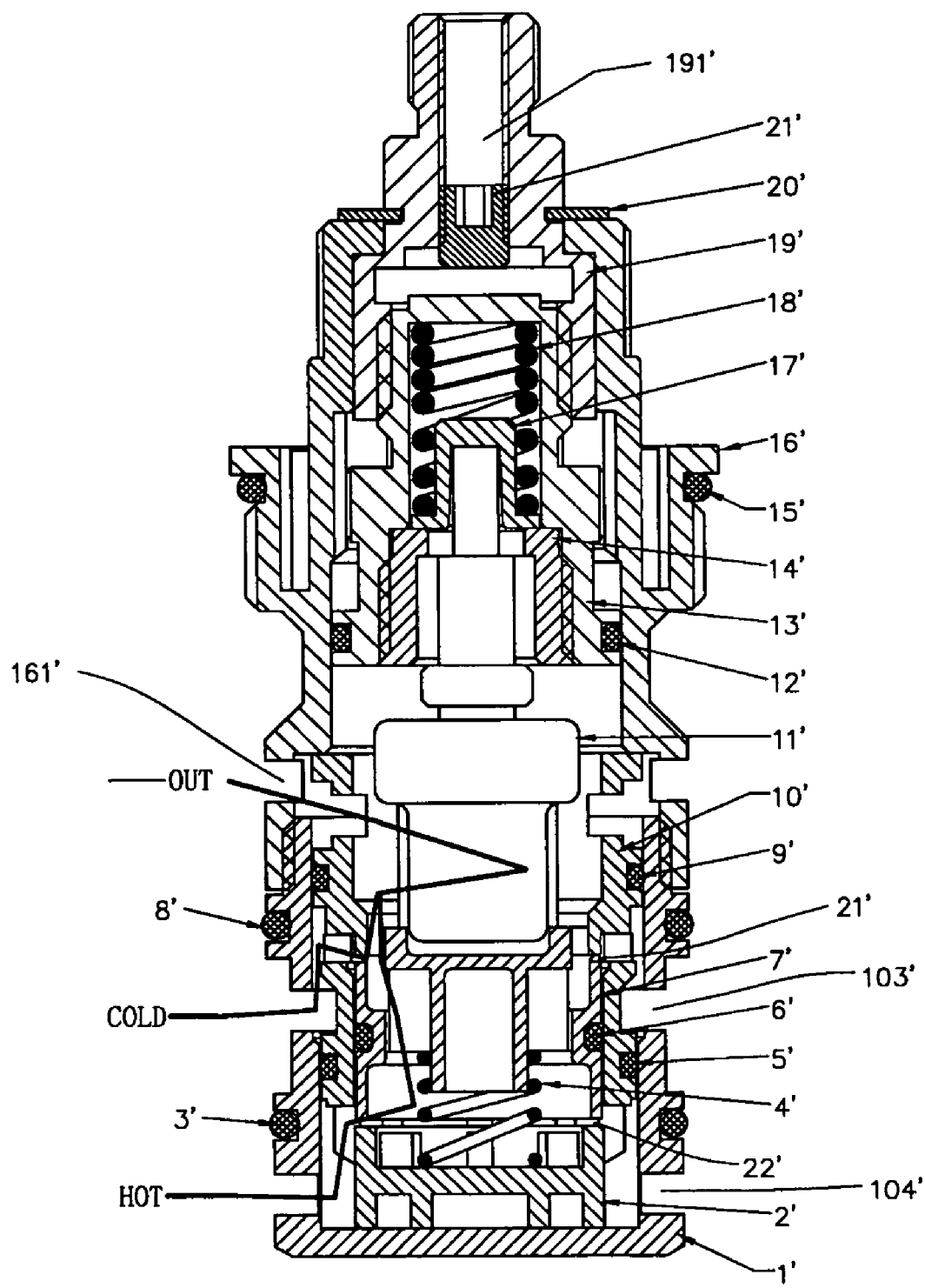
FIG. 8 is a section view of the embodiment II of the invention.
Figure 9:
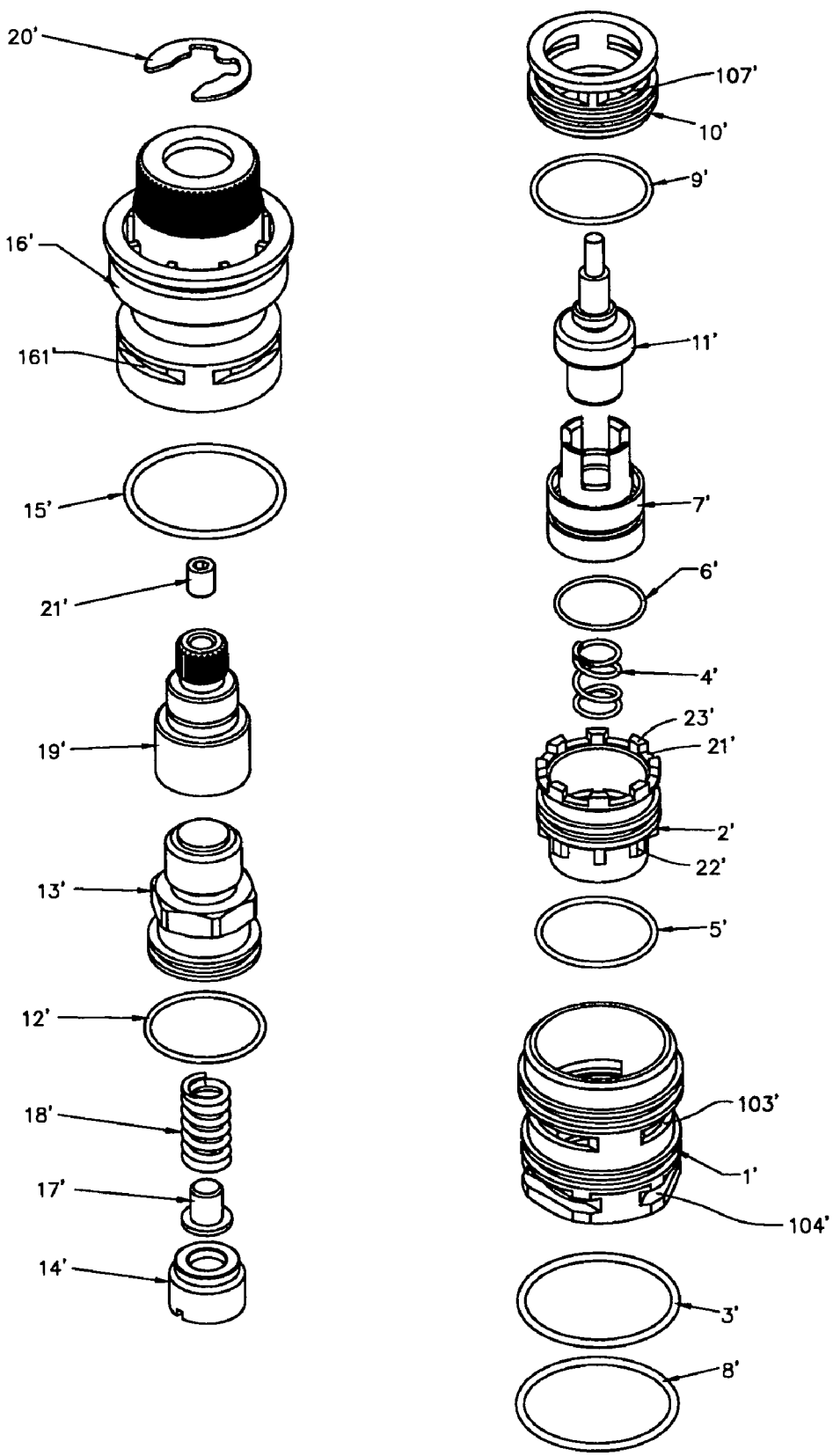
FIG. 9 is an explosion diagram of the embodiment II of the invention.

Referring to the FIGS. 7, 8 and 9, the constant temperature and balanced pressure valve core with single handle provided by the embodiment comprises a lower valve cover 1', a first seal ring 3', a second seal ring 8', a water division part 2', a third seal ring 5', a put-off spring 4', an adjuster 7', a fourth seal ring 6', a compacting sealing part 10', a fifth seal ring 9', a thermo sensitive element 11', a fixing screw 14', a tip cap 17', a buffer spring 18', a sixth seal ring 12', a screw-stem 13', a valve handle 19', a temperature adjusting valve cover 16', a seventh seal ring 15', a limit ring 20' and a temperature limiting and adjusting screw 21'.

Referring to the FIGS. 8 and 9, the seventh seal ring 15' is arranged on the periphery of the temperature adjusting valve cover 16'; a water outlet 161' is arranged on the lower part of the temperature adjusting valve cover 16', and an internal screw thread is arranged in the lower port of the temperature adjusting valve cover 16'. An external screw thread is correspondingly arranged on the upper part of the lower valve cover 1', and the side wall of the lower part of the lower valve cover 1' is equipped with a cold water inlet 103' and a hot water inlet 104'. The temperature adjusting valve cover 16' is arranged by matching with the lower valve cover 1' up and down, consequently, a whole valve cover is formed (combining the FIG. 7), and an chamber is formed in the interior of the whole valve cover.

Referring to the FIGS. 8 and 9, an inner hole is processed in the screw-stem 13'; the buffer spring 18', the tip cap 17' and the fixing screw 14' are arranged in the inner hole of the screw-stem 13' from top to bottom, which forms a whole link gear of the valve handle; the tip cap 17' is compacted by the fixing screw 14' matching with the buffer spring 18', and the tip cap 17' props and matches with the thimble of the thermo sensitive element 11'. The screw-stem 13' matches with the valve handle 19' through the trapezoid thread; consequently, the whole link gear can be driven to make reciprocating action up and down when turning the valve handle 19' leftward and rightward; in order to avoid rotation of the screw-stem 13' with the valve handle 19', a hexagon is designed in the periphery of the screw-stem 13' in the embodiment; consequently, the screw-stem can only slide up and down in the valve cover. The upper part of the valve handle is extruded from the top of the temperature adjusting valve cover 16'; the whole temperature adjusting assembly which is used for matching and adjusting the heat sensitivity of the thermo sensitive element 11' composes of the valve handle 19' and the link gear, and accordingly, the outlet water temperature can be preset. The a limit ring 20' is arranged in the gear ring groove, which is cut on the valve handle 19', and clings on the top of the temperature adjusting valve cover 16'; the sixth seal ring 16' is arranged between the inner wall of the temperature adjusting valve cover 16' and the outer wall of the screw-stem 13'. An inner bolt hole 191' is arranged in the valve handle 19'; the temperature limiting and adjusting screw 21' whose height can be adjusted is arranged in the inner bolt hole 191', which can downward prop with the screw-stem 13'.

Referring to the FIGS. 8 and 9, the first seal ring 3' and the second seal ring 8' are arranged in the different height of the periphery of the lower valve cover 1'; the water division part 2' is arranged at the inner foot of the lower valve cover 1', and its bottom matches with the foot of the lower valve cover 1'; the side wall of the water division part 2' is equipped with the third seal ring 5', which matches with the inner wall of the lower valve cover 1. the cold water passage is formed between the part of the water division part 2' above the third seal ring 5' and the inner wall of the lower valve cover 1', the hot water passage is formed between the part of the water division part 2' below the third seal ring 5' and the inner wall of the lower valve cover 1'. The upper part of the water division part 2' is equipped with the cold water control port 21', and the lower part is equipped with the hot water control port 22'. A pressure bearing part 23' is arranged at the place of the cold water control port 21'. The compacting sealing part 10' is a ring shape whose center hole is a water outlet and used as puncture of the water sensing probe of the thermo sensitive element 11'. The fifth seal ring 9' is arranged on the periphery of the compacting sealing part 10', and by the fifth seal ring 9', the compacting sealing part 10' forms sealing with the inner wall of the lower valve cover 1, and the compacting sealing part 10' downward matches with the pressure bearing 23' and compacts the water division part 2' in the lower valve cover 1'. A compacting sealing part 10' is provided with a water outlet corresponding port 107'.

The temperature sensing probe of the thermo sensitive element 11' extends in the lower valve cover 1', and cooperates with the adjuster 7'; the adjuster 7' is arranged in the water division part 2', and the third seal ring 6' is arranged between the inner wall of the water division part 2' and the adjuster 7'; the put-off spring 4' is arranged below the adjuster 7' and props between the bottom of the adjuster 7' and the foot of the water division part 2'; the adjuster 7' can make reciprocating action up and down between the cold water control port 21' and the hot water control port 22' by the action of the thermo sensitive element 11' and the put-off spring 4'. The common technicians in the field can understand that: by designing proper structure, the adjuster can be fully arranged in the periphery of the water division part 2', and the function of controlling the cold water control port 21' and the hot water control port 22' can be realized.

The working procedure of the constant temperature and balanced pressure valve core with single handle provided by the embodiment is as follows: cold and hot water are respectively input from the cold water inlet 103' and the hot water inlet 104', and reach the cold water control port 21' and the hot water control port 22' after respectively passing through the cold water passage and the hot water passage formed by the water division part 2'; and then flow into the fixed water chamber according to the current proportion controlled by adjuster 7'; after fully mixing, flow upward to the temperature sensing probe of the thermo sensitive element 11'; and finally flow out from the water outlet 161' after passing the central hole of the compacting sealing part 10'. Meanwhile, the outlet water temperature is real-time controlled by the thermo sensitive element 11', when the supply water temperature or pressure changes, the thermo sensitive element 11' will cooperate with the put-off spring 4' to drive the adjuster 7' to move up and down, so as to change the inlet proportion of cold and hot water, and keep the outlet water constant temperature.

The principle of water temperature adjusting of the constant temperature and balanced pressure valve core with single handle provided by the embodiment is as follows: turn the temperature adjusting valve handle 19' leftward and rightward; the rotation of the valve handle 19' can be converted into the reciprocating action up and down of the link gear of the valve handle through the function of the trapezoid thread; consequently, the link gear of the valve handle can drive the thimble of the thermo sensitive element 11'; accordingly, the heat sensitivity of the thermo sensitive element 11' can be regulated, and the temperature can be preset.

The principle of balanced pressure of the constant temperature and balanced pressure valve core with single handle provided by the embodiment is as follows: by arranging water division part 2' and making use of its cold and hot water inlet control ports, flexuous cold and hot inlet water passages is formed. In theory, the flexuous inlet water passage has a certain resistance or inhibition for inlet water; the test result shows that the flexuous inlet water passage has obvious function in balancing inlet water pressure.

The principle of controlling maximum safe water temperature of the constant temperature and balanced pressure valve core with single handle provided by the embodiment is as follows: by arranging the temperature limiting and adjusting screw 21' in the inner bolt hole 191' of the valve handle 19', the temperature limiting and adjusting screw 21' can downward prop the link gear of the valve handle; by adjusting the height of the temperature limiting and adjusting screw 21', the relative position of the link gear of the valve handle and the valve handle 19' can be limited; consequently, the upper limit value of adjusting temperature can be preset when application.

The embodiment is only for fully disclosure, but does not restrict the invention, so all those obvious immaterial alterations or improvements made by the technicians in the technical field after enlightening by the invention belong to the range disclosed by the invention.

The invention claimed is:

1. A constant temperature and balanced pressure valve core with single handle comprises a valve cover, and a temperature adjusting assembly, a thermo-sensitive element, a put-off spring, an adjuster, combined in the chamber of the valve cover from top to bottom; and the valve cover is provided with a cold water inlet, a hot water inlet and an water outlet; wherein the valve core also comprises a water division mechanism and an compacting sealing part; the water division mechanism matches with the cold water inlet and the hot water inlet, forming the cold water passage and hot water passage, and provides a cold water control port and a hot water control port that respectively match with the cold water passage and the hot water passage; the compacting sealing part forms seal with the inner wall of the valve cover, and compacts the water division mechanism in the valve cover; the adjuster matches with the thermo-sensitive element and the put-off spring, and on the action of the thermo-sensitive element and the put-off spring, the adjuster can float between the cold water control port and the hot water control port.

2. The constant temperature and balanced pressure valve core with single handle according to claim 1, wherein the water division mechanism comprises a water separation part and a water division part, the bottom of the water separation part is equipped with a sealing mechanism separating cold water inlet from hot water inlet, the cold water passage is formed between the outer wall of the water separation part and the inner wall of the valve cover; the hot water passage is formed in the interior of the water separation part; the top of the water division part is equipped with the cold water control port, and the foot of the water division part is equipped with the hot water control port; the water division part is hermetically matched with the water separation part by the seal ring between the cold water control port and the hot water control port.

3. The constant temperature and balanced pressure valve core with single handle according to claim 2, wherein the adjuster and the put-off spring are combined in the chamber that formed by the water diversion part and the compacting sealing part, the adjuster props the bottom of the thermo sensitive element, and the put-off spring is arranged below the adjuster.

4. The constant temperature and balanced pressure valve core with single handle according to claim 2, wherein the power part of the water division part is arranged in the water separation part, and the upper part is supported on the top of the water separation part, a pressure bearing part is arranged at the place of the cold water control port, and the compacting sealing part matches with the pressure bearing part downward.

5. The constant temperature and balanced pressure valve core with single handle according to claim 4, wherein the adjuster and the put-off spring are combined in the chamber that formed by the water diversion part and the compacting sealing part, the adjuster props the bottom of the thermo sensitive element, and the put-off spring is arranged below the adjuster.

6. The constant temperature and balanced pressure valve core with single handle according to claim 4, wherein the valve cover comprises a temperature adjusting valve cover and a lower valve cover, which are arranged by matching up and down; the water outlet is arranged on the upper part of the lower valve cover, and the cold water inlet and the hot water inlet are arranged at the bottom of the lower valve cover.

7. The constant temperature and balanced pressure valve core with single handle according to claim 6, wherein the foot of the lower valve cover is equipped with a water separation and coordination mechanism.

8. The constant temperature and balanced pressure valve core with single handle according to claim 2, wherein the valve cover comprises a temperature adjusting valve cover and a lower valve cover, which are arranged by matching up and down; the water outlet is arranged on the upper part of the lower valve cover, and the cold water inlet and the hot water inlet are arranged at the bottom of the lower valve cover.

9. The constant temperature and balanced pressure valve core with single handle according to claim 8, wherein the foot of the lower valve cover is equipped with a water separation and coordination mechanism.

10. The constant temperature and balanced pressure valve core with single handle according to claim 1, wherein the water division mechanism is a single water division part, the side wall of the water division part is equipped with a sealing mechanism, which matches with the inner wall of the valve cover, the cold water passage is formed between the part of the water division part above the sealing mechanism and the inner wall of the valve cover, the hot water passage is formed between the part of the water division part below the sealing mechanism and the inner wall of the valve cover; the upper part of the water division is equipped with the cold water control port, and the lower part is equipped with the hot water control port.

11. The constant temperature and balanced pressure valve core with single handle according to claim 10, wherein the lower part of the water division part matches with the foot of the valve cover; a pressure bearing part is arranged at the place of the cold water control port, and the compacting sealing part matches with the pressure bearing part downward.

12. The constant temperature and balanced pressure valve core with single handle according to claim 11, wherein the adjuster and the put-off spring are combined in the chamber that formed by the water diversion part and the compacting sealing part; the adjuster props the bottom of the thermo sensitive element, and the put-off spring is arranged and props between the bottom of the adjuster and the foot of the water division part.

13. The constant temperature and balanced pressure valve core with single handle according to claim 11, wherein the valve cover comprises a temperature adjusting valve cover and a lower valve cover, which are arranged by matching up and down; the water outlet is arranged at the lower part of the temperature adjusting valve cover, and the cold water inlet and the hot water inlet are arranged on the side wall of the lower valve cover.

14. The constant temperature and balanced pressure valve core with single handle according to claim 10, wherein the adjuster and the put-off spring are combined in the chamber that formed by the water diversion part and the compacting sealing part; the adjuster props the bottom of the thermo sensitive element, and the put-off spring is arranged and props between the bottom of the adjuster and the foot of the water division part.

15. The constant temperature and balanced pressure valve core with single handle according to claim 10, wherein the valve cover comprises a temperature adjusting valve cover and a lower valve cover, which are arranged by matching up and down; the water outlet is arranged at the lower part of the temperature adjusting valve cover, and the cold water inlet and the hot water inlet are arranged on the side wall of the lower valve cover.

16. The constant temperature and balanced pressure valve core with single handle according to claim 1, wherein: the compacting sealing part is equipped with a water outlet corresponding port.

17. The constant temperature and balanced pressure valve core with single handle according to claim 1, wherein the temperature adjusting assembly comprises a valve handle, a link gear of the valve handle and a temperature limiting and adjusting screw, the upper part of the valve handle protrudes from the top of the temperature adjusting valve cover, the link gear of the valve handle matches with the lower part of the temperature adjusting valve handle, and makes reciprocating action up and down driven by the temperature adjusting valve handle, a inner bolt hole is arranged in the valve handle, and the temperature limiting and adjusting screw whose height can be adjusted is matched with the inner bolt, which can prop with the link gear of the valve handle downward.

18. The constant temperature and balanced pressure valve core with single handle according to claim 17, wherein the valve core also comprises a temperature limiting and adjusting screw, and an inner bolt hole is processed on the valve handle; the temperature limiting and adjusting screw whose height can be adjusted is arranged in the inner bolt, which can prop with the link gear of the valve handle downward.

* * * * *